Figure 1:
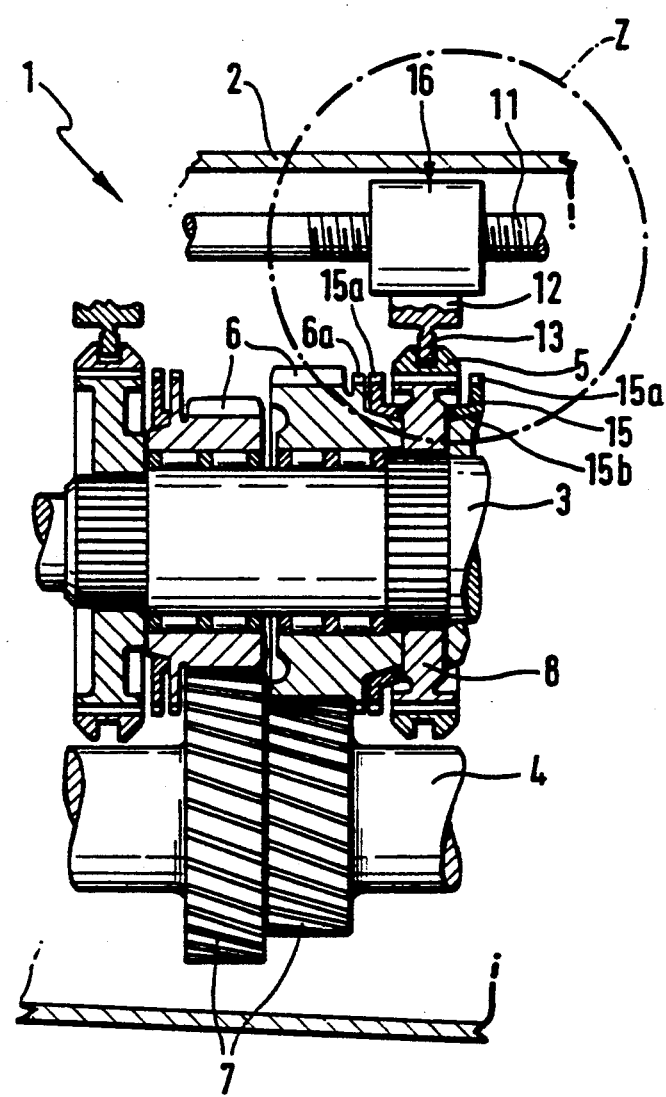

United States Patent [19]

Schneider

[11] Patent Number: 5,205,179
[45] Date of Patent: Apr. 27, 1993

[54] SPEED CHANGING DEVICE

[75] Inventor: Joachim Schneider, Dusseldorf, Fed. Rep. of Germany

[73] Assignee: INA Walzlager Schaeffler KG, Fed. Rep. of Germany

[21] Appl. No.: 950,422

[22] Filed: Sep. 23, 1992

Related U.S. Application Data

[63] Continuation of Ser. No. 729,042, Jul. 12, 1991, abandoned.

[30] Foreign Application Priority Data

Jul. 21, 1990 [DE] Fed. Rep. of Germany ....... 4023321
Feb. 20, 1991 [DE] Fed. Rep. of Germany ....... 4105157

[51] Int. Cl.$^5$ .............................................. F16H 3/08
[52] U.S. Cl. ........................................ 74/365; 74/335; 74/89.15; 74/424.8 B
[58] Field of Search ................... 74/335, 365, 424.8 B, 74/89.15

[56] References Cited

U.S. PATENT DOCUMENTS

| | | | |
|---|---|---|---|
| 2,604,788 | 7/1952 | Hauber | 74/335 OR |
| 2,649,813 | 8/1953 | Barth et al. | 74/335 OR |
| 2,821,089 | 1/1958 | Russell | 74/335 OR |
| 3,277,734 | 10/1966 | Bernard | 74/335 OR |
| 3,407,680 | 10/1968 | Westmoreland | 74/424.8 B OR |
| 4,019,616 | 4/1977 | Thorne | 74/424.8 X |
| 4,449,416 | 5/1984 | Huitema | 74/365 X |
| 4,614,128 | 9/1986 | Fickler | 74/424.8 R OR |
| 4,873,881 | 10/1989 | Edelen et al. | 74/365 X |
| 4,938,088 | 7/1990 | Langley et al. | 74/335 OR |

*Primary Examiner*—Rodney H. Bonck
*Assistant Examiner*—Daniel Wittels
*Attorney, Agent, or Firm*—Bierman and Muserlian

[57] ABSTRACT

A speed changing device for a gear box, particularly for a toothed change speed gear of a motor vehicle in which a gear wheel, freely rotatable on a driven shaft can be coupled with the driven shaft by means of an axially displaceable claw ring and a toothed bushing, the claw ring being axially displaceable by an electric driving device via a gearshift fork, arranged on a selector shaft which is parallel to the driven shaft, characterized in that the gearshift fork is axially displacable on the associated stationary selector shaft by a spindle drive comprising an externally threaded section arranged on the selector shaft and an internally threaded section, the axes of both threaded sections being arranged on the axis ($D_1$), of the selector shaft and one of the threaded sections being actuatable by rotation by an electromotor.

14 Claims, 6 Drawing Sheets

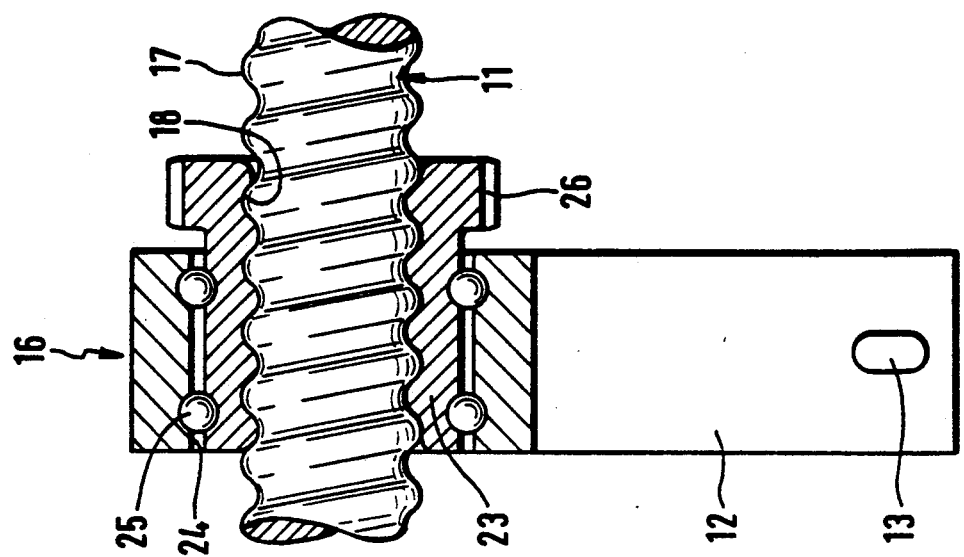

SPEED CHANGING DEVICE

PRIOR APPLICATION

This application is a continuation of U.S. patent application Ser. No. 729,042 filed Jul. 12, 1991, now abandoned.

STATE OF THE ART

Speed changing devices for a gearbox, particularly for a toothed change speed gear of a motor vehicle in which a gearwheel, freely rotatable on a driven shaft can be coupled with the driven shaft by means of an axially displacable claw ring and a toothed bushing, the claw ring being axially displacable by means of an electric driving means via a gearshift form arranged on a selector shaft which is parallel to the driven shaft are known. A speed changing device for a multi-step reduction gear of a motor vehicle in which electromagnets are used for the actuation of the toothed gearing is known from U.S. Pat. No. 2,647,411. A disadvantage of this system is that it is not possible to obtain a continuous movement with the electromagnets but only an abrupt transition between the two switching positions of the electromagnets. Further, it has to be assured by appropriate measures that the last speed selected is retained even in case of a failure of the power supply in such speed changing devices.

DE-PS 28 06 904 describes a speed changing device for a multi-shaft sliding gear transmission which serves to displace the sliding gear clusters. The speed changing device consists of a cam drive with output levers actuated by control cams, with end switches and switching cams, each corresponding in number to the number of switching positions, arranged on the shaft of each cam drive for the angular positioning of the control cams. The switching cams and the end switches are required to retain the sliding gear clusters in the respective position in each case. Such a speed changing device requires a relatively large space and is therefore not suitable for mounting in a gearbox of a motor vehicle. Further, the manufacturing of the gearbox with such a speed changing device becomes considerably more expensive.

OBJECTS OF THE INVENTION

It is an object of the invention to provide a speed changing device for a shift transmission which enables a continuous transition from one speed to another and which moreover requires less mounting space and is less expensive.

This and other objects and advantages of the invention will become obvious from the following detailed description.

THE INVENTION

The speed changing device of the invention for a gearbox, particularly for a toothed change speed gear of a motor vehicle in which a gearwheel, freely rotatable on a driven shaft can be coupled with the driven shaft by means of an axially displacable claw ring and a toothed bushing, the claw ring being axially displacable by an electric driving means via a gearshift fork arranged on a selector shaft which is parallel to the driven shaft is characterized in that the gearshift fork is axially displacable on the associated stationary selector shaft by a spindle drive comprising an externally threaded section arranged on the selector shaft and an internally threaded section, the axes of both threaded sections being arranged on the axis ($D_1$) of the selector shaft and one of the threaded sections being actuatable by rotation by an electromotor.

A spindle drive offers the possibility of a continuous and joltless insertion of the required gear, synchronization being possible for example by frictional engagement between the synchronizing rings and the gearwheels. According to the state of the art, an axial displacement of the gearshift fork is effected with the help of a shift linkage, a cam drive or a plurality of electromagnets. According to the invention, a shift linkage can be dispensed with because the axial displacement is effected by a spindle drive and the axial motion of the gearshift fork for the actuation of the gearwheel couples is obtained by the spindle drive rotating with the internally threaded section on the externally threaded section of the selector shaft. The selector shaft is retained stationary and the function of the shift linkage can be assumed by a less expensive and weight-saving selector lever with electric selector contacts. Further, the possibility exists, for example in a multi-step toothed change speed gear, to depart from the compact constructional mode and integrate the individual gearwheel couples of the different speeds partially in the front axle differential and/or in the rear axle differential.

In a first embodiment of the Invention, the externally threaded section is made directly on the unrotatable selector shaft and an actuatable sleeve is arranged axially displacable and rotatable on the externally threaded section.

By virtue of the design of the spindle drive with a sleeve comprising an internally threaded section which is mounted rotatable on the externally threaded section of the unrotatable selector shaft, the possibility exists of arranging an electromotor co-axially with the selector shaft or outside the selector shaft axis for the actuation of the sleeve.

In another embodiment of the invention, the externally threaded section is part of a hollow cylindrical projection of the gearshift fork, which projection is arranged so as to be unrotatable but axially displacable on the unrotatable selector shaft, and the actuatable sleeve with its internally threaded section is retained axially fixed but rotatable with respect to the externally threaded section.

The embodiment of the speed change device comprising an electromotor which is stationary and unrotatable also offers an economical alternative in which the gearshift fork is provided with a hollow cylindrical projection having an externally threaded section and the sleeve with an internally threaded section is mounted axially fixed but rotatable on the externally threaded section. A rotational motion of the sleeve in this case causes an axial motion of the hollow cylindrical projection with rigidly connected gearshift fork for the switching of the gearwheel couples.

Alternatively, in a further development of the invention, the externally threaded section can be part of a hollow cylindrical pipe section which is rigidly connected with the unrotatable selector shaft, and the actuatable sleeve with its internally threaded section can be arranged so as to be axially displacable and rotatable on the externally threaded section and be connected with the gearshift fork so as to be relatively rotatable but axially fixed.

In this embodiment, the hollow cylindrical pipe section is rigidly connected with the selector shaft and comprises an externally threaded section. A sleeve with an internally threaded section is mounted so as to be rotatable and axially displacable on the externally threaded section and is connected rotatably with the gearshift fork, so that a rotational motion of the sleeve is transformed directly into an axial motion of the gearshift fork.

In a further development of the invention, the externally threaded section is provided directly on the driven selector shaft and the sleeve with a gearshift fork or a gearshift fork with internally threaded sections is arranged axially displacable and unrotatable, on the externally threaded section. This solution provides a driven selector shaft with an externally threaded section and a sleeve with a gearshift fork or a gearshift fork with internally threaded sections which likewise permits the direct transformation of the rotational motion into a translatory motion. In this case, it is, however, necessary that there be a selector shaft for each gearshift fork as conceivable, for instance, in the case of a divided multi-step toothed change speed gear.

In a further development of the invention, the externally threaded section is part of an actuatable bushing which is arranged so as to be axially stationary but rotatable on the unrotatable selector shaft, the internally threaded section being comprised in a bore of the gearshift fork. This alternative solution provides a bushing which is arranged so as to be axially fixed but rotatable on the selector shaft and which possesses an externally threaded section. The actuation of the spindle drive is effected in this case by an electromotor arranged outside the selector shaft axis via a chain or toothed belt drive.

In a further embodiment of the invention, the externally threaded section is provided on a bushing and the internally threaded section on a co-axially arranged sleeve, the bushing and/or the sleeve being actuatable and the unactuated component being retained unrotatable by a torque support or the two components being actuated in opposing directions.

In all cases, a particularly exact and precise positioning of the gearshift fork on the selector shaft is made possible and in addition, the space requirement is so small that the spindle drive, for example in the first embodiment, can be integrated directly into the gearshift fork. In this case, the possibility exists that the sleeve be mounted so as to be rotatable but axially fixed in a bore of the gearshift fork and both components be retained axially displacable together on the selector shaft, the sleeve comprising a toothing with the help of which the spindle drive is actuated via a toothed belt or chain drive by an electromotor arranged outside the longitudinal axis of the selector shaft. Further, for moving the gearshift fork, the electromotor can be integrated in a bore of the gearshift fork, the electromotor of the spindle drive being designed in this case as a hollow shaft motor and the sleeve being designed as an inner rotor. However, it is also possible to mount a cylindrical pipe section and being rotatably connection with the gearshift shaft, which pipe section is designed partially as a stator, the rotor in the form of a coaxial outer sleeve with internally threaded section being mounted on the externally threaded section and being rotatably connection with the gearshift fork. The sleeve, i.e. the rotor of the hollow shaft motor can be arranged co-axially inside or outside the stator in keeping with the examples described.

In a further development of the invention, the rotor of the electromotor is made of a permanently magnetic material. Feedlines to the rotor can therefore be dispensed with and this substantially reduces the manufacturing costs of the electromotor. It is advantageous to mount the rotor on the stator by means of deep groove ball bearings. According to another characteristic of the invention, the deep groove ball bearings can be made as angular contact ball bearings to guarantee a large supporting width. Mounting is effected with the help of an outer race groove formed on the stator and an inner race groove formed on the rotor.

According to a further characteristic of the invention, the spindle drive with both its threaded sections is a rolling bearing screw drive, a ball screw drive or a roller screw drive. By designing the spindle drive as a rolling bearing screw drive, a ball screw drive or a roller screw drive, particularly easy running is obtained and the power requirement from the electromotor is reduced. Alternatively, the possibility exists that the thread of the internally and externally threaded sections be an easy-running thread operating in the self-locking range.

Figure 2:
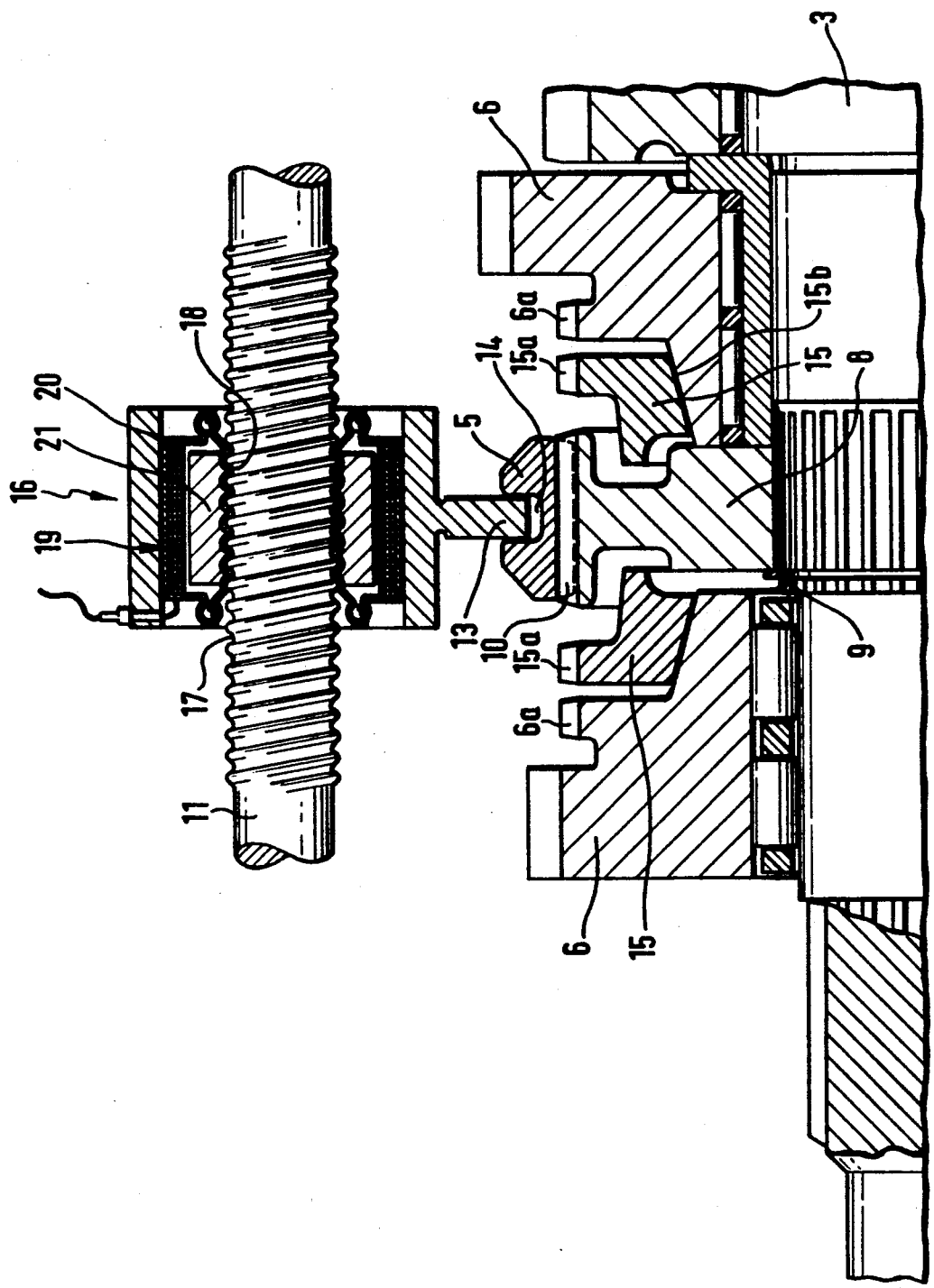
Figure 4B:
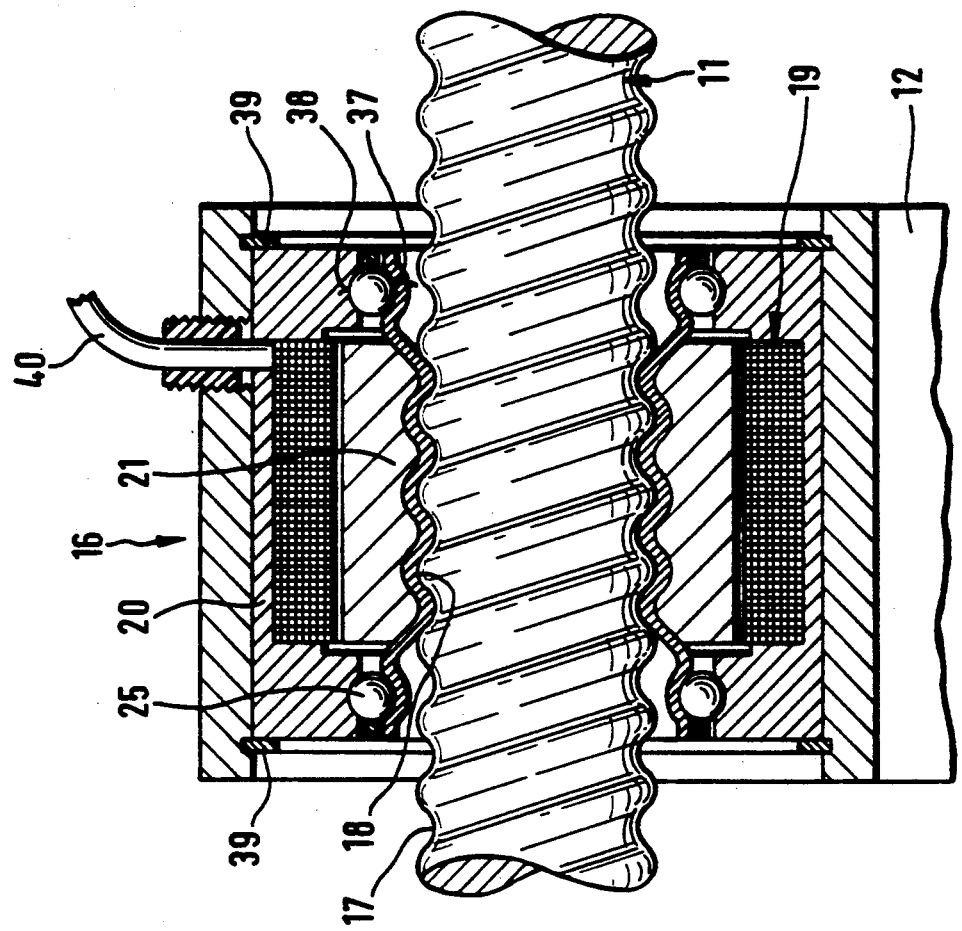
Figure 4A:
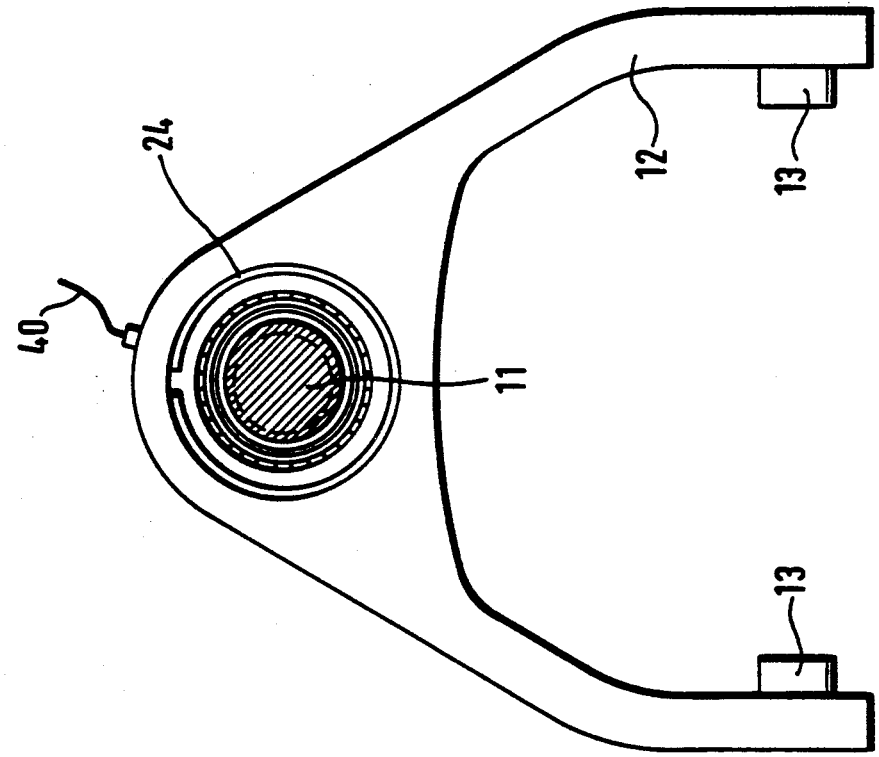
Figure 5B:
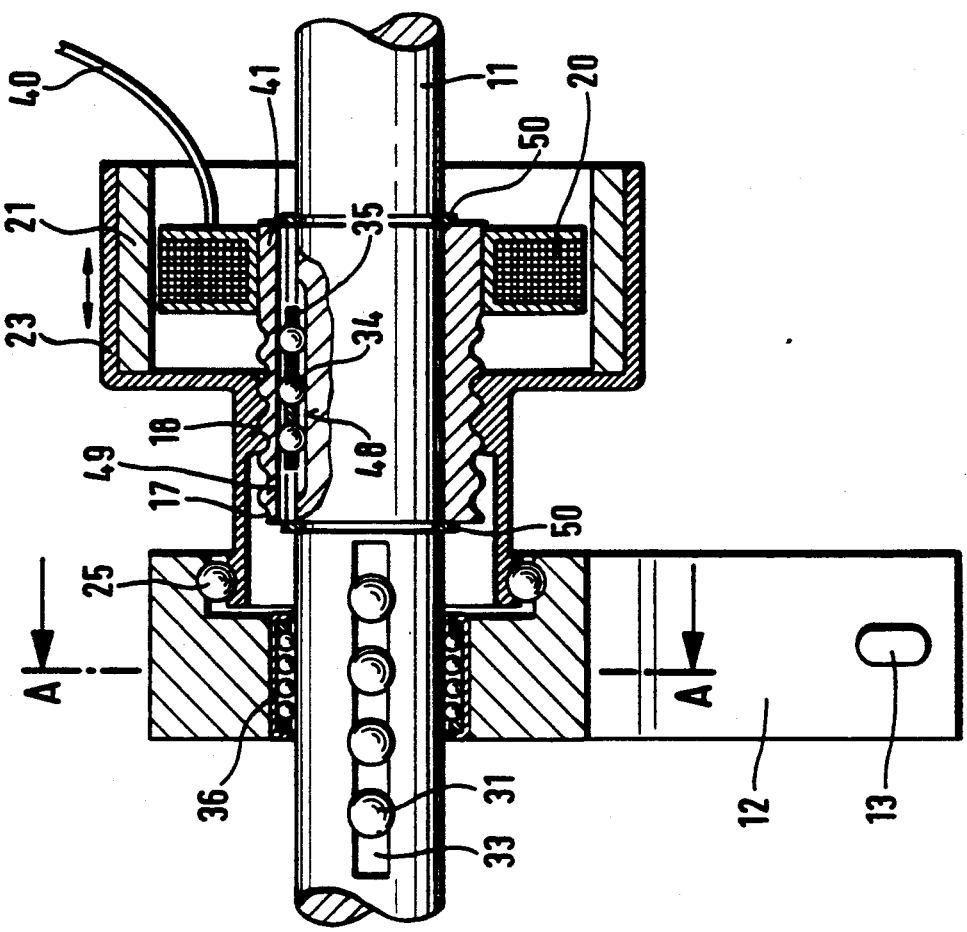
Figure 5A:
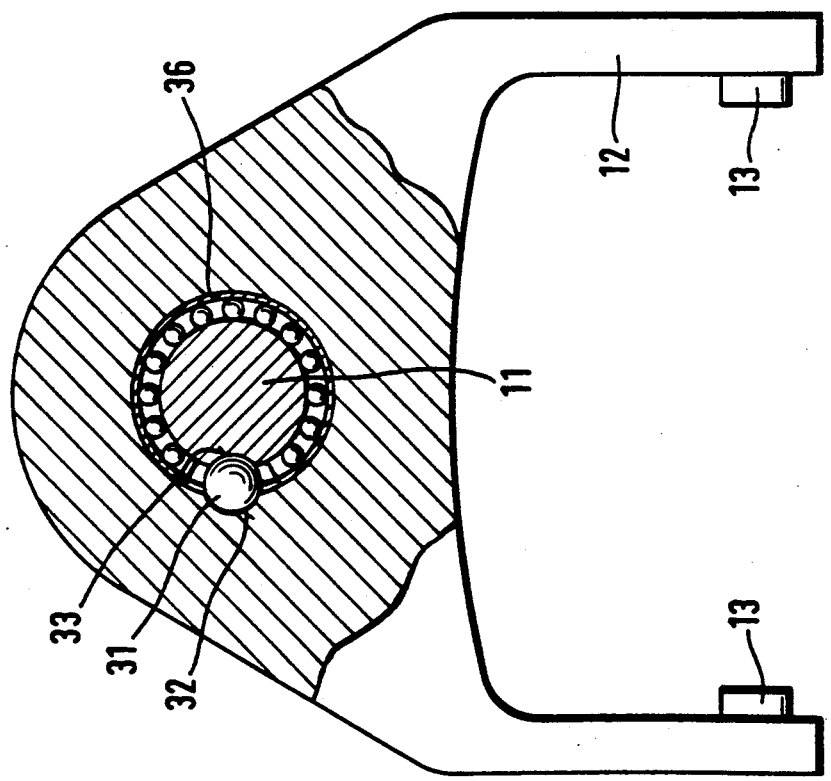
Figure 6:
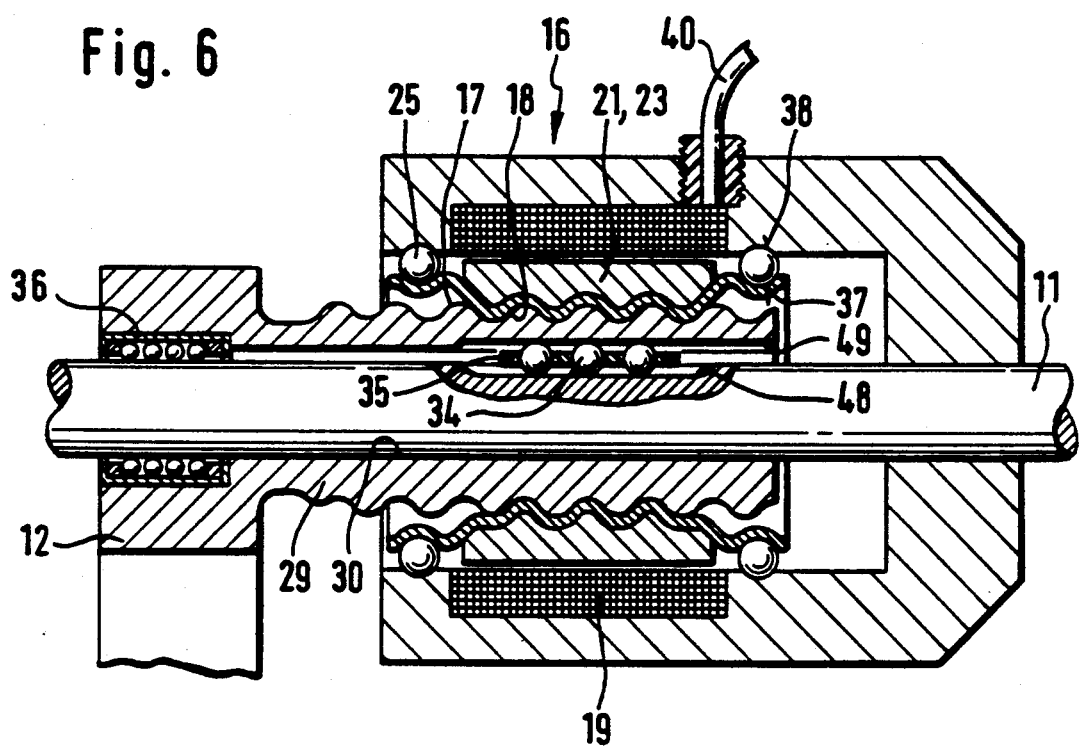
Figure 7:
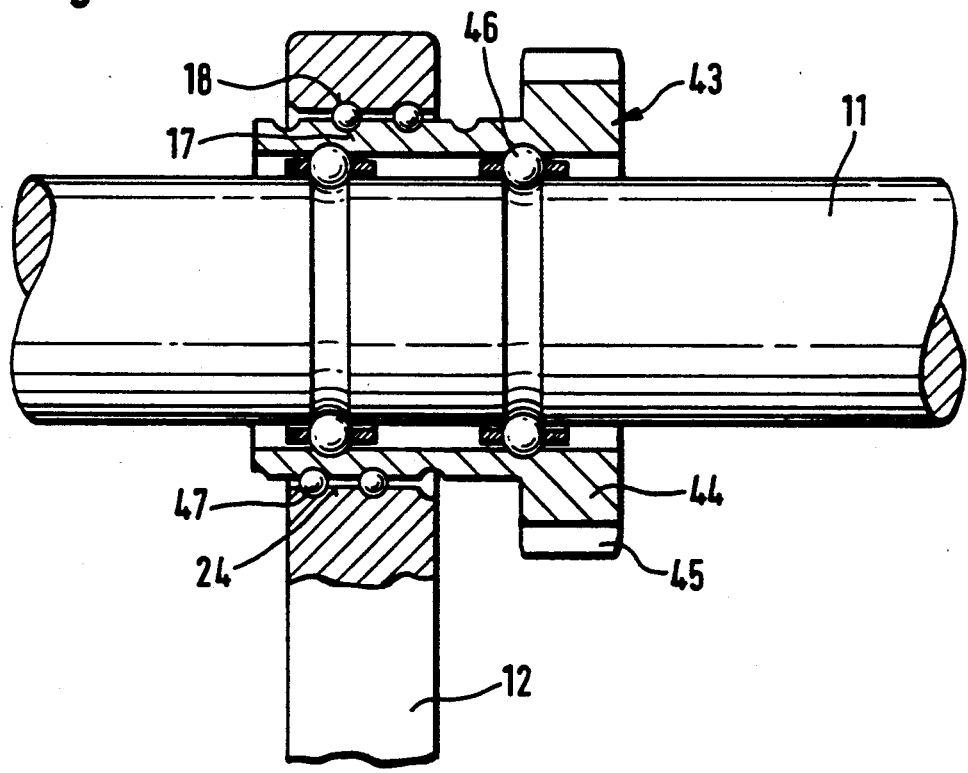

Referring now to the drawings:

FIG. 1 is a partial cross-sectional view of a part of a gearbox,

FIG. 2 is an enlarged detail Z of FIG. 1 with a gearshift fork, a selector shaft and an electromotor, FIG. 3a is a side view of a spindle drive with toothed belt drive for the sleeve and FIG. 3b is a sectional view of the spindle drive, FIG. 4a is a side view of the gearshift fork with a hollow shaft motor and FIG. 4b is a sectional view of a hollow shaft motor, FIG. 5a is a section A—A according to FIG. 5b and 5b is a sectional view of a hollow shaft motor with outer rotor, FIG. 6 is a sectional view of a hollow shaft motor with inner rotor, and FIG. 7 is a sectional view of a spindle drive with a bushing and a ball screw drive.

FIG. 1 shows a partially sectional view of a part of a gearbox 1, for example a change speed gear for a motor vehicle. The gearbox 1 comprises a casing 2 in which a driving shaft 4 and a driven shaft 3 are mounted with the help of mounting aids, not shown. The driving shaft 4 is actuated via a flanged joint or a toothing projecting out of the casing 2 and the driven shaft 3 transmits the torque via similar means. Gearwheels 7 are unrotatably connected with the driving shaft 4 and permanently engaged with the gearwheels 6 of the driven shaft 3. The gearwheels 6 of the driven shaft 3 are not directly unrotatably connected with the driven shaft 3, but each one is individually unrotatably connected with the driven shaft 3 via a toothed bushing 8 and a synchronizing ring 15. One gearwheel 7 of the driving shaft 4 is permanently associated with each gearwheel 6 of the driven shaft 3.

In the upper part of the casing 2, a selector shaft 11 is arranged so as to be stationary, and one or more gearshift forks 12 are mounted axially displacably on it. The gearshift fork 12 engages by its selector heads 13 into the guide groove 14 of the axially displacable claw ring 5 which is mounted on an internally and externally toothed bushing 8. The toothed bushing 8 is mounted axially rigid on the driven shaft 3 by means of circlips 9 and transmits the torque via the inner toothing to the driven shaft 3. The synchronizing ring 15 and the gearwheel 6 of the driven shaft 3 comprise an outer toothing each, 15a and 6a respectively, into which the inner toothing 10 of the claw ring 5 engages. On displacement of the claw ring 5, engagement is first effected with the toothing 15a of the synchronizing ring 15 whereby the toothed bushing 8 and the driven shaft 3 are brought to a speed corresponding to that of the driving shaft 4 by the agency of a friction lining 15b of the synchronizing ring 15 before the claw ring 5 establishes a non-rotating connection with the driven shaft 3 via the toothing 6a of the gearwheel 6. A non-rotating connection between the driven shaft 3 and one of the gearwheels 6 causes a transmission of torque from the driving shaft 4 via the gearwheels 6, 7, the claw ring 5 and the toothed bushing 8 to the driven shaft 3 of the change speed gear.

FIG. 2 shows an enlarged detail Z of FIG. 1. The invention replaces the usual driving mechanism of the gearshift forks 12 in the gearbox 1 by a spindle drive 16 comprising an externally threaded section 17 and an internally threaded section 18 and a rotary electromotor 19 comprising a stator 20 and a rotor 21. The selector shaft 11 is unrotatably fixed in the casing 2 and, in a first embodiment of the spindle drive 16, comprises one or even more fixed threaded sections 17 for each gear couple 6, 7 or for two gear couples 6, 7 in each case. A thread was selected for the externally and internally threaded sections, 17 and 18 respectively, which is easy-running but which operates in the self-locking range. Alternatively, it is possible to design the spindle drive 16 as a rolling bearing screw drive, a ball screw drive or a roller screw drive as illustrated for example in FIG. 7. In FIGS. 3a, b the electromotor 19 is represented with a toothed belt drive 22 for a sleeve 23 for displacing the gearshift fork 12. The electromotor 19 in the form of a hollow shaft motor is represented in FIG. 1, in an enlarged detail Z in FIG. 2 and in partial sections in FIG. 4b, 5b and 6, the actuation of the gearshift fork 12 in FIG. 5 being likewise effected via a sleeve 23. FIG. 7 shows an embodiment with an actuatable bushing 43.

FIGS. 3a and b show a gearshift fork 12 with selector heads 13 which is mounted on the selector shaft 11 so as to prevent rotation and which, for displacing the synchronizing rings 15, engages into the guide grooves 14 of the claw ring 5. The gearshift fork 12 comprises a bore 24 in which the spindle drive 16 with the sleeve 23 and the internally threaded section 18 is rotatably mounted via deep groove ball bearings 25, the internally threaded section 18 being arranged on the corresponding externally threaded section 17.

The actuation of the sleeve 23 is effected via a toothing 26 of the sleeve 23 and a toothed belt 22 by means of an electromotor 19 situated outside the selector shaft axis $D_1$, which electromotor comprises a pinion 27 for the toothed belt 22 on the motor axis $D_2$. The electromotor 19 is fixed on the outer periphery 28 of the gearshift fork 12. On rotation of the electromotor 19, the sleeve 23 is actuated by the toothed belt 22 and the rotational motion is transformed by the spindle drive 16 into an axial movement of the gearshift fork 12. Several externally threaded sections 17 on one selector shaft 11 or one externally threaded section 17 on each of several selector shafts 11 are required for the individual gear couples 6, 7, the possibility existing, for example in the case of a change speed gear of a motor vehicle, to integrate the individual gear couples 6, 7 separately in the front axle gearbox and/or in the rear axle gearbox so that the compact arrangement of the hitherto known change speed gears is no longer compulsory.

The electromotor 19 of FIGS. 4a and b designed as a hollow shaft motor is particularly economical because it comprises a rotor 21 with an internally threaded section 18 corresponding to the externally threaded section 17 of the selector shaft 11 and is retained in a bore 24 of the gearshift fork 12. By a rotation of the rotor 21, a direct axial movement of the gearshift fork 12 is obtained. The stator 20 of the electromotor 19 has to be arranged in this case to be unrotatable but axially movable together with the gearshift fork 12. A suitable material for the rotor 21 is a permanently magnetic material so that no feedlines 40 are required for a coil winding. FIG. 4a shows a side view of the gearshift fork 12 with a hollow shaft motor and FIG. 4b shows the hollow shaft motor in an enlarged sectional representation. Two race grooves 37 are formed on the rotor 21 for a bearing means, e.g. a deep groove ball bearing 25 or an angular contact ball bearing. The stator 20 of the electromotor 19 likewise comprises two race grooves 38 and is integrated in the gearshift fork 12 in which it is rigidly mounted between circlips 39. When current is fed to the electromotor 19 via the feedlines 40, an immediate transformation of the rotational motion into an axial forward movement of the gearshift fork 12 takes place.

FIG. 5b shows an alternative embodiment of a spindle drive 16 with a hollow shaft motor in a sectional side view in which a radially widened sleeve 23 carries a permanent magnet on its inside so that the sleeve 23 is designed at the same time as a rotor 21 and arranged co-axially outside with respect to the stator 20. FIG. 5a shows a section A—A with a race bushing 36 and a ball sleeve 31 which serve to secure the gearshift fork 12 against rotation on the selector shaft 11. The stator 20 is constituted by a hollow cylindrical pipe section 41 which is unrotatably connected with the selector shaft 11 and comprises an externally threaded section 17 as well as a radially widened portion which receives the stator windings and the feedlines 40. The pipe section 41 is secured against rotation by balls 34 in ball cages 35 which are guided commonly in a linear race groove 48 of the selector shaft 11 and in a linear race groove 49 of the pipe section 41. Circlips 50 are provided for the axial fixing of the pipe section 41. The rotor 21 possesses a radially narrowed portion with an internally threaded section 18 which is mounted so as to be rotatable and axially displacable on the externally threaded section 17 of the pipe section 41, and a widened portion associated with the stator 20. The rotor 21 is connected rotatably with the gearshift fork 12 by means of deep groove ball bearings 25, the gearshift fork 12 being mounted by means of a slit race bushing 36 so as to be axially displacable but secured against rotation by means of a ball sleeve 31 in linear race grooves 32 and 33 of the gearshift fork 12 and the selector shaft 11, respectively.

In the example of embodiment of FIG. 6, the selector shaft 11 does not comprise any externally threaded section 17 but a hollow cylindrical projection 29 of the gearshift fork 12 having a bore 30 is guided axially displacably on an outer surface of the selector shaft 11 and possesses an externally threaded section 17 on the projection 29 which constitutes the thread of the selector shaft 11. A guidance of the gearshift fork 12 on the selector shaft 11 is achieved by means of a race bushing 36 arranged in the bore 30. Further, in the region of the projection 29, circumferentially spaced linear race grooves 49 are located in the bore 30 and corresponding linear race grooves 48 are arranged on the selector shaft 11, in which grooves balls 34 in ball cages 35 are commonly guided and serve to prevent rotation so that the gearshift fork 12 with the projection 29 is connected with the selector shaft 11 so as to be secure against rotation but axially displacable. The sleeve 23 is designed as a rotor 21 of a hollow shaft motor and comprises an internally threaded section 18 corresponding to the externally threaded section 17. The stator in this case is arranged so as to be stationary, for example in the casing 2 or on the selector shaft 11 so that a rotation of the rotor 21 causes the projection 29 to be turned in or out resulting in an axial movement of the gearshift fork 12.

FIG. 7 shows a further example of embodiment of the spindle drive 16 with an actuatable bushing 43. The bushing 43 is mounted so as to be rotatable but axially rigid by means of ball bearings 46 on the selector shaft 11 and comprises an externally threaded section 17 which is designed as a ball screw drive. In the bore 24 of the gearshift fork 12, a corresponding internally threaded section 18 is arranged which is mounted by means of balls 47 on the externally threaded section 17 of the bushing 43. The bushing 43 further comprises a radially widened projection 44 having a toothing 45. The bushing 43 is actuated, as in the example of embodiment of FIG. 3, by means of a toothed belt or a chain drive. An axial displacement of the bushing 43 is prevented by the ball bearings 46 so that on rotation of the bushing 43, the gearshift fork 12 is displaced axially. The threaded sections 17, 18 of the other examples of embodiment can likewise be replaced by a ball screw drive.

By virtue of the fact that the gearshift fork 12 is moved with the help of an electromotor via a spindle drive 16, a continuous and not a jolty movement is achieved during the speed changing operation and a very exact positioning of the gearshift fork 12 is obtained with a few turns of the spindle drive 16. By simple controls for the electromotors 19 it can be assured that only one gear couple 6, 7 at a time is effective for the transmission of torque between the driving shaft 4 and the driven shaft 3.

Various modification of the speed changing device of the invention may be made without departing from the spirit or scope thereof and it should be understood that the invention is intended to be limited only as defined in the appended claims.

What I claim is:

1. A speed changing device for a toothed change speed gear (1) of a motor vehicle in which a gearwheel (6) freely rotatable on a driven shaft (3) can be coupled with the driven shaft (3) by an axially displaceable claw ring (5) and a toothed bushing (8), the claw ring (5) being axially displaceable by a one-piece gearshift fork (12) which is actuated by an electric driving means and is arranged on a selector shaft (11) which extends parallel to the driven shaft (3), characterized in that the gearshift fork (12) is axially displaceable by a spindle drive (16) which radially surrounds only the associated unrotatable selector shaft (11), the spindle drive (16) comprises an externally threaded section (17) arranged on the selector shaft (11) and an internally threaded section (18), a longitudinal axis D1 of the selector shaft (11) coincides with longitudinal axes of the components carrying the externally and internally threaded sections, one of the externally threaded section and internally threaded section (17, 18) being actuatable by an electromotor (19) integrated and mounted in the gearshift fork (12).

2. A speed changing device of claim 1 wherein the internally threaded section (18) is provided on an actuatable sleeve (23) which is mounted so as to be axially displaceable and rotatable on the externally threaded section (17) which is provided on the selector shaft (11).

3. A speed changing device of claim 1 wherein the externally threaded section (17) is part of a hollow cylindrical pipe section (41) which is rigidly connected with the unrotatable selector shaft (11), and the actuatable sleeve (23) comprising the internally threaded section (18) is arranged so as to be axially displaceable and rotatable on the externally threaded section (17) and is connected with the gearshift fork (12) so as to be relatively rotatable but axially fixed.

4. A speed changing device of claim 1 wherein the spindle drive (16) comprising the externally and internally threaded sections (17, 18) is a rolling bearing screw drive, a ball screw drive or a roller screw drive.

5. A speed changing device of claim 1 wherein the thread of the internally and externally threaded sections (17, 18) is an easy-running thread which operates in the self-locking range.

6. A speed changing device of claim 3 wherein the electromotor (19) is designed as a hollow shaft motor comprising a stator (20) and a rotor (21), the rotor (21) being constituted by the sleeve (23).

7. A speed changing device of claim 6 wherein the rotor (21) of the hollow shaft motor is arranged coaxially inside or outside the stator.

8. A speed changing device of claim 7 wherein the stator (20) of the hollow shaft motor is integrated in a bore (24) of the gear shift fork (12).

9. A speed changing device of claim 7 wherein the stator (20) of the hollow shaft motor is connected unrotatably and axially rigidly with the selector shaft (11).

10. A speed changing device of claim 7 wherein a part of a cylindrical pipe section (41) is designed as a stator (20) of the hollow shaft motor.

11. A speed changing device of claim 6 wherein the rotor (21) of the hollow shaft motor is made of a permanently magnetic material.

12. A speed changing device of claim 6 wherein the rotor (21) is mounted on the stator (20) by the means of two deep groove ball bearings (25).

13. A speed changing device of claim 12 wherein the deep groove ball bearings (25) are designed as angular contact ball bearings.

14. A speed changing device of claim 12 wherein an outer race groove (37) is part of the stator (20) and an inner race groove (38) is formed on the rotor (21).

* * * * *